July 3, 1962 J. E. GRANDIDGE 3,041,879
PRESSURE MEASURING DEVICES
Filed Jan. 20, 1959 2 Sheets-Sheet 1
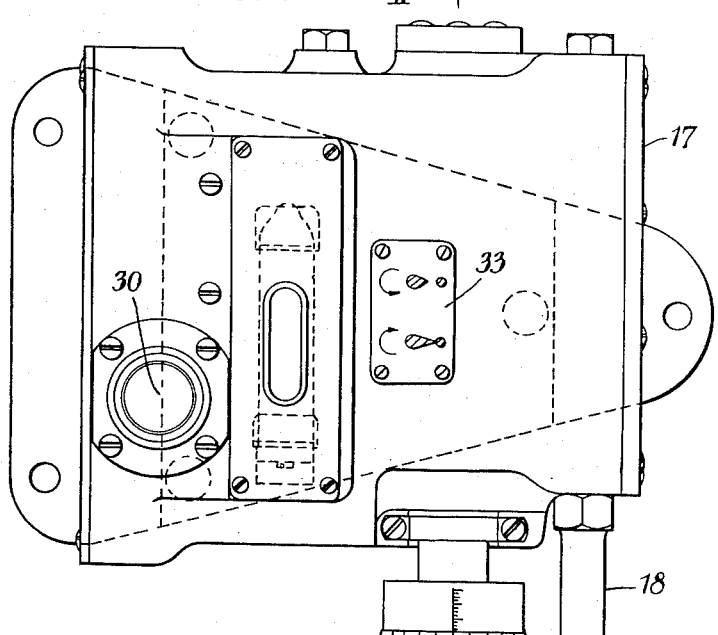
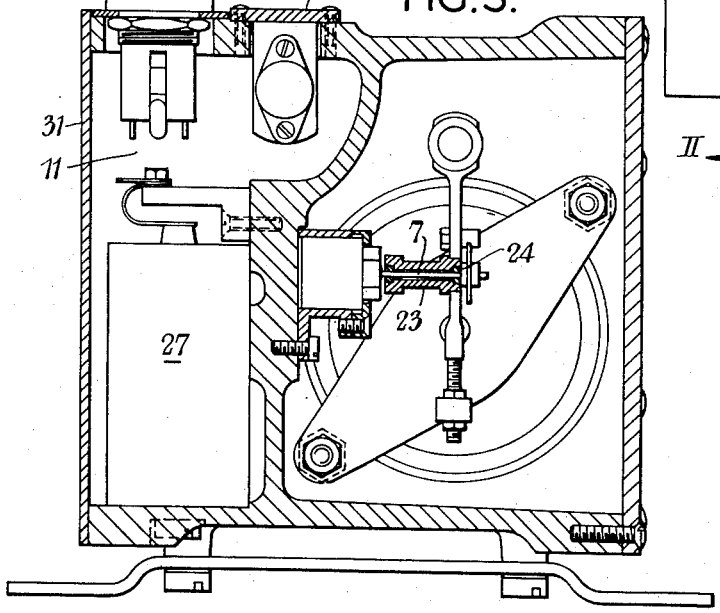
INVENTOR:
JOHN EVERARD GRANDIDGE
By
Richardson, David and Tardon
ATTYS

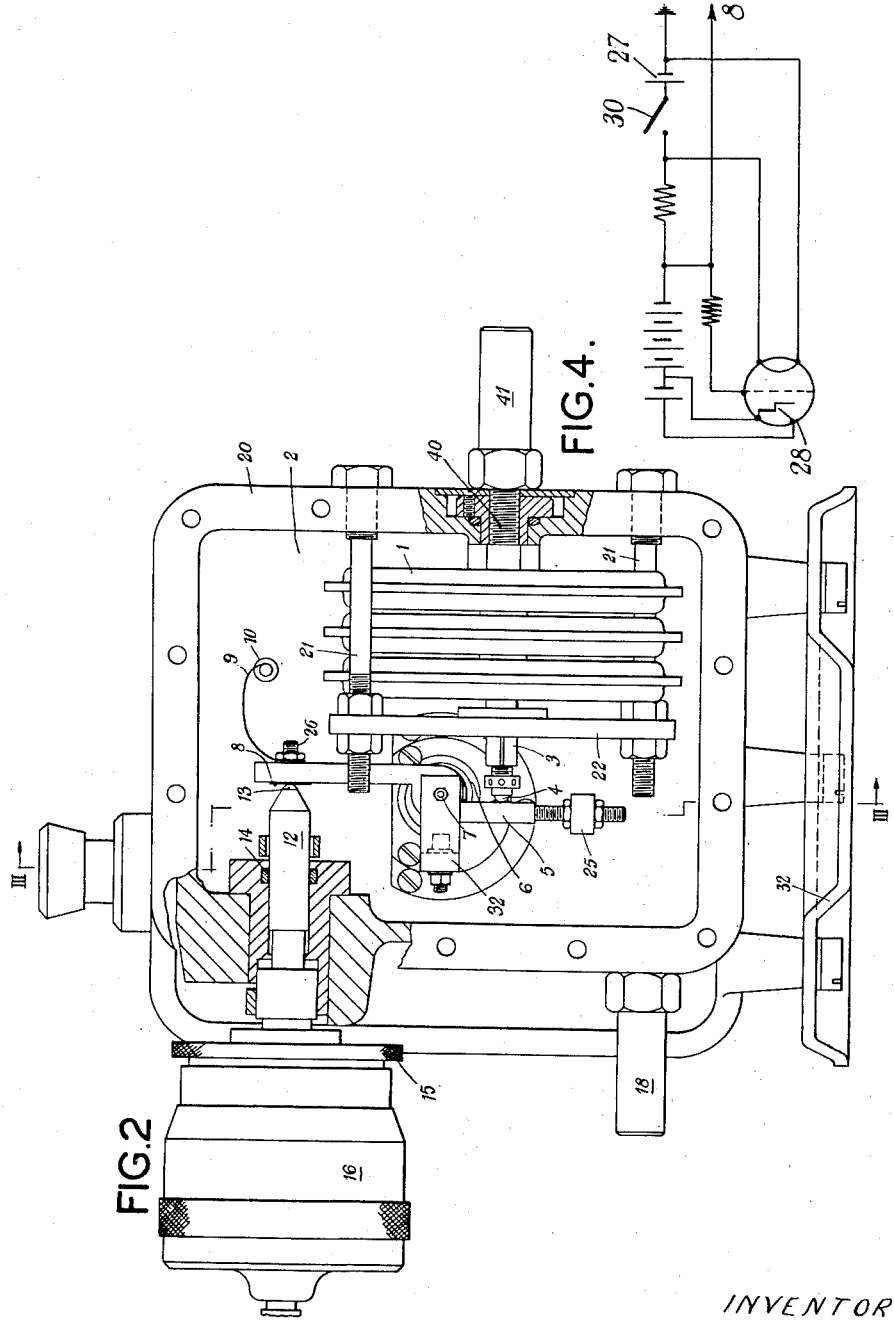

United States Patent Office 3,041,879
Patented July 3, 1962

3,041,879
PRESSURE MEASURING DEVICES
John Everard Grandidge, Lingfield, England, assignor to Mechanism Limited, Croydon, England
Filed Jan. 20, 1959, Ser. No. 787,992
5 Claims. (Cl. 73—398)

This invention concerns improvements in or relating to pressure measuring devices and has more particular reference to devices which are generally based upon the principles employed in aneroid barometers. The devices of the present invention are adapted to the measurement of both absolute and differential pressure.

It will be known that an aneroid barometer, which is one particular form of absolute pressure gauge adapted to operate over a specific range, is a device for measuring pressures at about atmospheric pressure but it has been found that the general principles employed in aneroid barometers may equally well be applied to the measurement of absolute pressures at ranges other than atmospheric pressure and also to the measurement of differential pressure. The conventional aneroid barometer makes use of a pressure sensitive element which is in the form of a capsule having one or more flexible walls, the capsule having its interior reduced to a vacuum and then sealed so that displacement of the flexible wall is a measure of the atmospheric pressure. Hereinafter such a device will be called a "pressure capsule." In the previously proposed apparatus the displacement of the flexible wall of the pressure capsule was measured by means of a suitable magnifying system of levers and gears intended to present the information by means of a pointer travelling over a circular scale. Unfortunately, high magnification lever systems of this type must be subject to damage by shock in view of the high inertia forces which are involved.

The primary object of the present invention is to provide a pressure gauge which is not liable to damage in this way.

It is a further object of the present invention to provide a pressure gauge adapted for the measurement of absolute pressure or differential pressure.

It is a still further object of the present invention to provide a pressure measuring device in which displacement of a flexible wall of the pressure capsule is signalled in a visable manner by using such displacement to shift the potential on a control electrode and thus vary the electron flow in an electronic circuit including a light emitting contact closure indicator.

According to yet another object of the invention a manually adjustable micrometer screw calibrated in units of pressure is used to control the position of a contact which is positioned to engage a movable contact which is displaced by movement of the wall of the pressure capsule and thereby controls the making and breaking of a substantially zero current indicating circuit.

In order that this invention may more readily be understood a preferred embodiment will be described with reference to the accompanying drawings.

In the drawings:

FIGURE 1 is a side elevation of the instrument;

FIGURE 2 is an end elevation with an end cap removed and partly shown in section taken on the line II—II of FIGURE 1;

FIGURE 3 is a cross section on the line III—III of FIGURE 2; and

FIGURE 4 is a circuit diagram.

Referring now to the drawings and more particularly to FIGURE 2 thereof, it will be seen that three serially connected individually longitudinally expansible pressure capsules 1, interconnected to reinforce the action of one another, are mounted in a chamber 2 forming part of a housing 20. The pressure capsules 1 are supported by means of a pair of pillars 21 and there is a rigid connection between the housing 20 and one end of the pressure capsules. Through this rigid connection there is a passage 40 commnuicating with the pressure capsules and receiving a nipple 41 at its outer end. The other end of the pressure capsules carries a spindle 3 on which is threaded for axial adjustment a mounting 4' for a ball 4 secured to its free end, the spindle 3 passing freely through a plate 22 secured across pillars 21 in such a manner as to act as an overload restraining plate to prevent the excessive expansion of the pressure capsules 1.

A cranked two-armed lever 5 is mounted upon a bearing bush 23 which is in turn mounted by means of jewel bearings 24 upon a spindle 7 so as to turn free thereon, but a light e.g. spiral hair spring 6 having one end anchored effectively to the housing 20 and the other to the lever 5 ensures that this lever is always kept in contact with the ball 4, the load applied by the spring 5 being so low as to be negligible in opposing expansion of the capsule. The two-armed construction of the lever 5 is to provide for symmetry and to enable fine adjustment of the balance of the two arms relative to the fulcrum of the lever, an adjustable weight 25 on the lower arm enabling the desired balance to be obtained. The other arm carries a flat insulated contact 8. It will be seen that the adjustable mounting 4' and the weight 25 afford a means for calibrating the apparatus. The flat insulated contact 8 is connected to a terminal 26 on the opposite side of the lever 5 and this terminal 26 is connected by a fine flexible ligament 9 to a terminal 10 which is a feedthrough terminal located in the wall of the chamber 2 in such manner as to be pressure tightly mounted therein. The other end of the terminal 10 emerges into a chamber 11 forming the second part of the housing 20.

A micrometer spindle 12 passes through the housing 20 and the wall of the chamber 2 and at its free end the spindle 12 carries a ball contact 13 which makes light contact with the contact 8 when the lever 5 has been set by the aforesaid calibrating means to a normal attitude, e.g. representing a balanced condition of the internal and external pressures on the capsule with negligible loading of the lever 5 against the ball 4. The spindle 12 is encircled by a flexible rubber O-ring 14 to ensure pressure tightness of the joint whilst the spindle is being moved endwise during operation of the instrument. The micrometer drum 16 turning with respect to a micrometer body 15 securely mounted in the housing 20 so that rotation of the drum 16 causes endwise movement of the ball 13, the drum 16 and the body 15 being suitably calibrated in the usual manner.

An end plate 17 closes the end of the chamber 2 in a pressure tight manner and a connecting nipple 18 is mounted on the wall of the chamber 2 so that connections can be made between the chamber 2 and a source of pressure for the purpose which will be described hereinafter.

Referring now more particularly to FIGURE 3, it will be seen that the partition which divides the housing 20 into the chambers 2 and 11 carries certain of the components and that the chamber 11 houses the electrical components necessary to measure the point at which contact occurs between the ball 13 and the contact 8, the ball 13 being regarded as being earthed. These electrical components consist of dry batteries for high and low tension supplies (only the low tension battery 27 being illustrated), an electron ray tuning indicator 28 which is visible from the exterior by means of a transparent window 29 in the housing 20, certain resistors (not shown) and a push button on/off switch 30. The arrangement of the circuit is illustrated in FIGURE 4 and it will be seen that it is so arranged that when the ball 13 and contact 8 come into contact the control grid voltage of the electron ray tuning indicator 28 is altered. It will be known that electron ray tuning indicators present a fluorescent screen which is illuminated in dependence upon the control grid voltage and no further description is thought to be necessary. Electrical components within the chamber 11 may easily be removed for adjustment or replacement by taking off a removable end plate 31.

In addition, the housing 20 is provided with a suitable mounting flange 32 the details of which obviously depend upon the precise mounting location and the housing also carries an instruction plate 33 adjacent to the window 29 in order to indicate in which direction the micrometer drum 16 should be turned in order to set the instrument as hereinafter described.

For the measurement of absolute pressure the nipple 41 is either connected to a known source of pressure or is blanked off or the pressure capsules are evacuated.

The operation of the instrument is as follows:

Assuming that the ball 13 and the contact 8 are in contact for some particular value of the pressure to be measured then there will be a certain known voltage applied to the control grid of the tuning indicator 28 and a certain picture will be visible through the window 29. If it is assumed that the pressure decreases, the pressure capsules 1 will expand to cause the lever 5 to rotate in a clockwise manner about the spindle 7 with the result that the contact 8 will be spaced from the ball 13. As previously described this causes a sharp change in the voltage on the control grid of the tuning indicator and the image will change and will remain in the changed condition as long as contact is not re-established. In order now to measure this lowered pressure, the drum 16 is rotated in the direction necessary to cause the ball 13 to move into contact with the contact 8 and cause a sharp change in the image shown through the window 29. The point at which contact is just made between the ball 13 and the contact 8 is a measure of the pressure and can be read off from the micrometer drum 16 in appropriate units. If instead of the unkown pressure decreasing it had increased then it would have been necessary to rotate the drum 16 to space the ball 13 from the contact 8 and then to remake this contact in order to measure the unknown pressure.

In calibrating the instrument of this invention, instead of placing the same in a pressure chamber provided with means for adjusting the micrometer drum and for viewing the window 29, it is merely necessary to connect two known sources of pressure to the nipples 18 and 41 whilst the remainder of the instrument, i.e. the portion outside the chamber 2, is subject to normal atmospheric pressure. Under normal operating conditions the two nipples 18 and 41 will be connected to the different sources of pressure that it is intended to measure and since one of these may be atmospheric pressure such nipple may be freely vented to the atmosphere. The pressure sources are regarded as fluid pressure sources, and in the event of the capsule being evacuated this is regarded as a negative fluid pressure source for the purpose of defining the ambit of the term "fluid pressure source."

It should be pointed out that the instrument of this invention is an instrument of very high accuracy and that in consequence it is necessary to measure the position of the ball 13 with the greatest accuracy that is possible by means of the micrometer screw. For this reason it is essential to use, as an indicator, a device which draws virtually no current and which is as sensitive as possible. Such a device is constituted by the electron ray tube indicator of the present invention but would not be constituted, for example, by a normal electric light bulb which would require too heavy a current supply. If a very heavy current is taken through the contact 8 then it is found that in a very short time the readings become erratic and not repeatable and furthermore that the surface of the contacts is destroyed by the current flow therethrough with the result that there is a long term change in the accuracy of the device. In the present case the operating current is of the order of .000001 amp.

I claim:

1. A pressure measuring device comprising: a longitudinally expansible pressure capsule connected for response to the pressure to be measured; a movable member connected for displacement by said capsule; a pivotally mounted lever; spring means biasing said lever into engagement with said movable member; a micrometer screw calibrated for measurement of said pressure; first electrical contact means displaceable by said screw; second electrical contact means displaceable by pivotal movement of said lever for engagement with and disengagement from said first contact means; a contact closure indicating circuit including said first and second contact means; and indicating means including a control electrode connected to said circuit for response to said engagement and disengagement, the current flow through said contact means for actuation of said indicating means being of the order of .000001 ampere.

2. A pressure measuring device according to claim 1, further comprising adjustable balancing means carried by said lever for displacing the center of gravity of said lever relative to the pivotal axis thereof.

3. A pressure measuring device comprising: a plurality of serially connected individually longitudinally expansible pressure capsule members forming a composite capsule unit connected for response to the pressure to be measured; a movable member connected for displacement by said capsule unit; a pivotally mounted lever; spring means biasing said lever into engagement with said movable member; a micrometer screw calibrated for measurement of said pressure; first electrical contact means displaceable by said screw; second electrical contact means displaceable by pivotal movement of said lever for engagement with and disengagement from said first contact means; a contact closure indicating circuit including said first and second contact means; and indicating means including a control electrode connected to said circuit for response to said engagement and disengagement, the current flow through said contact means for actuation of said indicating means being of the order of .000001 ampere.

4. A pressure measuring device comprising: a longitudinally expansible pressure capsule for response to the pressure to be measured; a fluid-tight housing enclosing said capsule; separate fluid conduit means communicating with said housing interiorly and exteriorly of said capsule; a movable member connected for displacement by said capsule; a pivotally mounted lever; spring means biasing said lever into engagement with said movable member; a micrometer screw calibrated for measurement of said pressure; first electrical contact means displaceable by said screw; second electrical contact means displaceable by pivotal movement of said lever for engagement with and disengagement from said first contact means; a contact closure indicating circuit including said first and second contact means; and indicating means including a control electrode connected to said circuit for response to said engagement and disengagement, the current flow through said contact means for actuation of said indicating means being of the order of .000001 ampere.

5. A pressure measuring device according to claim 4, further comprising adjustable balancing means carried by said lever for displacing the center of gravity of said lever relative to the pivotal axis thereof.

References Cited in the file of this patent

UNITED STATES PATENTS

| 2,715,339 | Honig | Aug. 16, 1955 |
| 2,715,680 | Tatel et al. | Aug. 16, 1955 |
| 2,769,341 | De Boisblanc | Nov. 6, 1956 |
| 2,931,965 | Bell | Apr. 5, 1960 |

FOREIGN PATENTS

| 237,247 | Germany | Aug. 3, 1911 |